US012573693B2

(12) United States Patent (10) Patent No.: US 12,573,693 B2
Shibaoka (45) Date of Patent: Mar. 10, 2026

(54) SEALING BODY AND BATTERY

(71) Applicant: FDK CORPORATION, Tokyo (JP)

(72) Inventor: Hiroyuki Shibaoka, Tokyo (JP)

(73) Assignee: FDK CORPORATION, Tokyo (JP)

( * ) Notice: Subject to any disclaimer, the term of this patent is extended or adjusted under 35 U.S.C. 154(b) by 348 days.

(21) Appl. No.: 16/967,257

(22) PCT Filed: Dec. 21, 2018

(86) PCT No.: PCT/JP2018/047134
§ 371 (c)(1),
(2) Date: Aug. 4, 2020

(87) PCT Pub. No.: WO2019/159532
PCT Pub. Date: Aug. 22, 2019

(65) Prior Publication Data
US 2020/0365857 A1 Nov. 19, 2020

(30) Foreign Application Priority Data

Feb. 16, 2018 (JP) ................................. 2018-026335

(51) Int. Cl.
H01M 50/152 (2021.01)
H01M 10/04 (2006.01)
(Continued)
(52) U.S. Cl.
CPC ......... H01M 50/152 (2021.01); H01M 10/04 (2013.01); H01M 50/169 (2021.01);
(Continued)
(58) Field of Classification Search
CPC ............. H01M 50/325; H01M 50/152; H01M 50/566; H01M 50/548
(Continued)

(56) References Cited

U.S. PATENT DOCUMENTS

2007/0212595 A1 9/2007 Kim et al.
2015/0303445 A1* 10/2015 Ido ......................... H01M 10/28
429/62
2020/0295319 A1* 9/2020 Ko ......................... B23K 26/08

FOREIGN PATENT DOCUMENTS

CN 101772850 A 7/2010
CN 107346808 A 11/2017
(Continued)

OTHER PUBLICATIONS

Takeshi, JP11354091A (machine translation), Dec. 1999, JPO, Description (Tran), p. 2 (Year: 1999).*
(Continued)

*Primary Examiner* — Tiffany Legette
*Assistant Examiner* — Paul Christian St Wyrough
(74) *Attorney, Agent, or Firm* — Kinney & Lange, P.A.

(57) ABSTRACT

Provided is a nickel-hydrogen secondary battery comprising a sealing body that seals an opening of an outer can, the sealing body includes a sealing plate, and a positive electrode cap welded to the sealing plate, the positive electrode cap includes a cylindrical body section, an annular flange provided along a circumferential edge of an opening located at a base end of the body section, and a top wall provided to close a tip opposite to the base end, and a welded part between the sealing plate and the positive electrode cap is located at a position where a ratio of X to R in percentage is 0% or more and 2% or less, in which R is a length from a center C of the flange to an outer circumferential edge of the flange, and X is a length from an edge of the welded part on an outer side in a radial direction of the flange to the outer circumferential edge of the flange.

19 Claims, 3 Drawing Sheets

(51) Int. Cl.

| | |
|---|---|
| *H01M 50/169* | (2021.01) |
| *H01M 50/325* | (2021.01) |
| *H01M 50/547* | (2021.01) |
| *H01M 50/566* | (2021.01) |
| *H01M 50/578* | (2021.01) |

(52) U.S. Cl.
CPC ....... *H01M 50/325* (2021.01); *H01M 50/547* (2021.01); *H01M 50/566* (2021.01); *H01M 50/578* (2021.01)

(58) Field of Classification Search
USPC .......................................................... 429/53
See application file for complete search history.

(56) References Cited

FOREIGN PATENT DOCUMENTS

| | | | | | |
|---|---|---|---|---|---|
| JP | H0982289 | A | * | 3/1997 | .......... H01M 50/325 |
| JP | H11354091 | A | * | 12/1999 | ............ Y02E 60/10 |
| JP | 2001126695 | A | * | 5/2001 | ............ Y02E 60/10 |
| JP | 2003045393 | A | | 2/2003 | |
| JP | 2005285637 | A | | 10/2005 | |
| JP | 2006351512 | A | | 12/2006 | |
| JP | 2009259701 | A | | 11/2009 | |
| KR | 20140106327 | A | | 9/2014 | |
| WO | 2012147782 | A1 | | 11/2012 | |

OTHER PUBLICATIONS

Yamaguchi, JP2001126695A (machine translation), May 2001, JPO, Description (Tran), p. 6 (Year: 2001).*
Takeshi (Translation) (Year: 1999).*
Yamaguchi (Translation) (Year: 2001).*
Hideaki (Translation) (Year: 1997).*
Burget "Modeling of deformation and failure behavior of dissimilar resistance spot welded joints under shear, axial and combined loading conditions" (Year: 2013).*
International Search Report and Written Opinion dated Mar. 5, 2019, for corresponding PCT Application No. PCT/2018/047134.
Extended European Search Report dated Oct. 1, 2021, received for corresponding European Application No. 18906596.4, six pages.

* cited by examiner

SEALING BODY AND BATTERY

CROSS-REFERENCE TO RELATED APPLICATION(S)

This application is the national phase of PCT Application No. PCT/JP2018/047134 filed on Dec. 21, 2018, which in turn claims priority to Japanese Application No. 2018-026335 filed on Feb. 16, 2018, the contents of which are incorporated by reference in their entireties.

BACKGROUND

Technical Field

The present disclosure relates to a sealing body and a battery comprising the sealing body.

Background Art

A battery is formed by storing an electrode group including a positive electrode and a negative electrode superimposed on each other via a separator together with an electrolyte in an outer can including an opening, and sealing the opening of the outer can with a sealing body. As this type of battery, a sealed type of nickel-hydrogen secondary battery is known.

Additionally, in the sealed type of nickel-hydrogen secondary battery, there is concern that in case where the positive electrode and negative electrode are wrongly charged (wrong charging) or overcharged, a gas is abnormally generated in the battery to raise a pressure in the battery, and the outer can is accordingly deformed to rupture the battery. Therefore, to prevent such rupture of the battery, in the sealed type of nickel-hydrogen secondary battery, a battery is variously developed to include a safety valve that is opened to discharge the gas to outside in case where the pressure of the gas generated in the battery is in excess of a constant value (e.g., see Patent Document 1 or the like).

Such a safety valve is usually disposed in the sealing body. Here, a structure of the sealing body including the safety valve is, for example, as follows.

The sealing body comprises a sealing plate including an exhaust hole and fitted in the opening of the outer can, a valve body disposed to close the exhaust hole, and a positive electrode cap that stores the valve body and also serves as a positive electrode terminal.

The positive electrode cap is, for example, a cylindrical member having one end portion opened, and the other end portion closed, and specifically comprises a cylindrical circumferential wall, an opening positioned at one end of the circumferential wall, a top wall positioned at the other end opposite to the opening, and a flange provided along a circumferential edge of the opening. Note that a gas venthole is provided in the circumferential wall of the positive electrode cap.

The above described valve body is formed of an elastic material, e.g., a rubber material, and has a columnar shape.

The valve body is stored in the positive electrode cap, and is in a compressed state between the top wall of the positive electrode cap and the above described sealing plate, and an opening end of the exhaust hole is closed up to a predetermined pressure, to keep sealability of the battery.

Here, the positive electrode cap is welded to the sealing plate in a state where the valve body is stored as described above. Specifically, the flange of the positive electrode cap is, for example, resistance-spot welded to the sealing plate.

For the above described valve body, if the gas is abnormally generated in the battery and the pressure of the gas in the battery rises and is in excess of a predetermined pressure, the valve body is elastically deformed due to the pressure of the gas, to open the exhaust hole of the sealing plate. Consequently, the gas in the battery is discharged to outside through the exhaust hole and the gas venthole of the positive electrode cap, and the rupture of the battery is prevented. Afterward, as the pressure of the gas in the battery drops, the valve body returns to its original shape to close the exhaust hole of the sealing plate. Consequently, the battery is again in a sealed state.

Additionally, when the pressure of the gas in the battery rises, the pressure is applied to the valve body, and accordingly, the pressure is also applied to the positive electrode cap with which the valve body is pressed. In this case, in the positive electrode cap, a force acts in a direction in which the flange is torn off from the sealing plate. Consequently, in a welded part between the flange of the positive electrode cap and the sealing plate, it is necessary to acquire a sufficient welding strength to withstand the force that acts in the direction in which the flange is torn off from the sealing plate.

To determine whether or not a suitable welded part having the sufficient welding strength is formed in the sealing body, a destructive inspection is usually performed as follows.

First, prepared is a sealing body obtained by completing resistance spot welding of the positive electrode cap and the sealing plate. Then, for the sealing body, the positive electrode cap is torn off from the sealing plate by use of a tool. This tearing operation is ended, and then surfaces of the sealing plate and the positive electrode cap that abut on each other are observed, to confirm whether or not there is a hollowed scar. Here, in the resistance spot welding, a current of electricity is supplied through a region interposed between welding electrodes, and in the region, a mother material is molten and then coagulates to form a so-called nugget as the welded part. The welding strength of the resistance spot welding per spot basically depends on a size of the nugget. Consequently, if the nugget is formed in a predetermined size, the sealing body having a predetermined welding strength is obtained. On the other hand, in case where the nugget is excessively small or any nuggets are not formed, the sealing body having the predetermined welding strength cannot be obtained. Consequently, if the suitable nugget is formed so that the predetermined welding strength can be acquired, and in case where the sealing body is torn off, either of the sealing plate or the flange of the positive electrode cap breaks, and a hollowed scratch is generated. Usually, a ratio of a number of sealing bodies in which scars are confirmed in all of spots to a total number of sealing bodies is obtained, and the ratio in percentage is defined as a generation ratio of the scars. Then, it is evaluated that the higher generation ratio of the scars indicates a higher welding strength and that the lower generation ratio of the scars indicates occurrence of a welding defect.

As a result of such a destructive inspection as described above, in case where it is determined that the welding defect occurs, a welding adjustment operation is performed.

PRIOR ART DOCUMENT

Patent Document

Patent Document 1: Japanese Patent Laid-Open No. 2003-045393

SUMMARY

Additionally, in such a destructive inspection as described above, individual differences are prone to be made in how to tear off the sealing body or the like, and it is difficult to perform stable evaluation. In particular, although the suitable nugget is generated and the sealing body having the predetermined welding strength is formed, any hollowed scratches may not be generated, and wrong determination may be made as to presence or absence of the scars. Thus, a ratio of the wrong determination to be made has been heretofore comparatively high, and the welding adjustment operation that originally does not have to be performed might be performed. Consequently, it is difficult to efficiently provide the sealing body having a stable welding quality.

The present disclosure has been developed in view of the above situations, and an object of the present disclosure is to provide a sealing body capable of decreasing wrong determinations in a destructive inspection of the sealing body, and a battery comprising the sealing body.

In order to achieve the above object, an aspect of the present disclosure is directed to a sealing body comprising a sealing plate, and a positive electrode cap welded to the sealing plate, wherein the positive electrode cap includes a cylindrical body section, an annular flange provided along a circumferential edge of an opening located at a base end of the body section, and a top wall provided to close a tip opposite to the base end, and a welded part between the sealing plate and the positive electrode cap is present in a region where the sealing plate and the flange are superimposed, and is located at a position where a ratio of X to R in percentage is 0% or more and 2% or less, in which R is a length from a center of the flange to an outer circumferential edge of the flange, and X is a length from an edge of the welded part on an outer side in a radial direction of the flange to the outer circumferential edge of the flange.

Furthermore, a configuration is preferable in which a plurality of the welded parts are provided via an equal space in a circumferential direction of the flange.

Additionally, another aspect of the present disclosure is directed to a battery comprising an outer can having an opening at an upper end, an electrode group stored together with an electrolyte in the outer can, and a sealing body that seals the opening of the outer can, wherein the sealing body is the above described sealing body according to the aspect of the present disclosure.

According to the present disclosure, provided is a sealing body comprising a sealing plate, and a positive electrode cap welded to the sealing plate, and in the sealing body, the positive electrode cap includes a cylindrical body section, an annular flange provided along a circumferential edge of an opening located at a base end of the body section, and a top wall provided to close a tip opposite to the base end, and a welded part between the sealing plate and the positive electrode cap is present in a region where the sealing plate and the flange are superimposed, and is located at a position where a ratio of X to R in percentage is 0% or more and 2% or less, in which R is a length from a center of the flange to an outer circumferential edge of the flange, and X is a length from an edge of the welded part on an outer side in a radial direction of the flange to the outer circumferential edge of the flange. Consequently, wrong determination in a destructive inspection can be inhibited, a number of unnecessary welding adjustment times can be decreased, and a manufacturing efficiency of a battery can be improved, which can contribute to stabilization of a quality of the battery.

DETAILED DESCRIPTION

Description will be made as to an alkaline secondary battery to which the present disclosure is applied, for example, in an example where the present disclosure is applied to a cylindrical nickel-hydrogen secondary battery (hereinafter, referred to as the battery) 2 with reference to the drawings.

Figure 1:
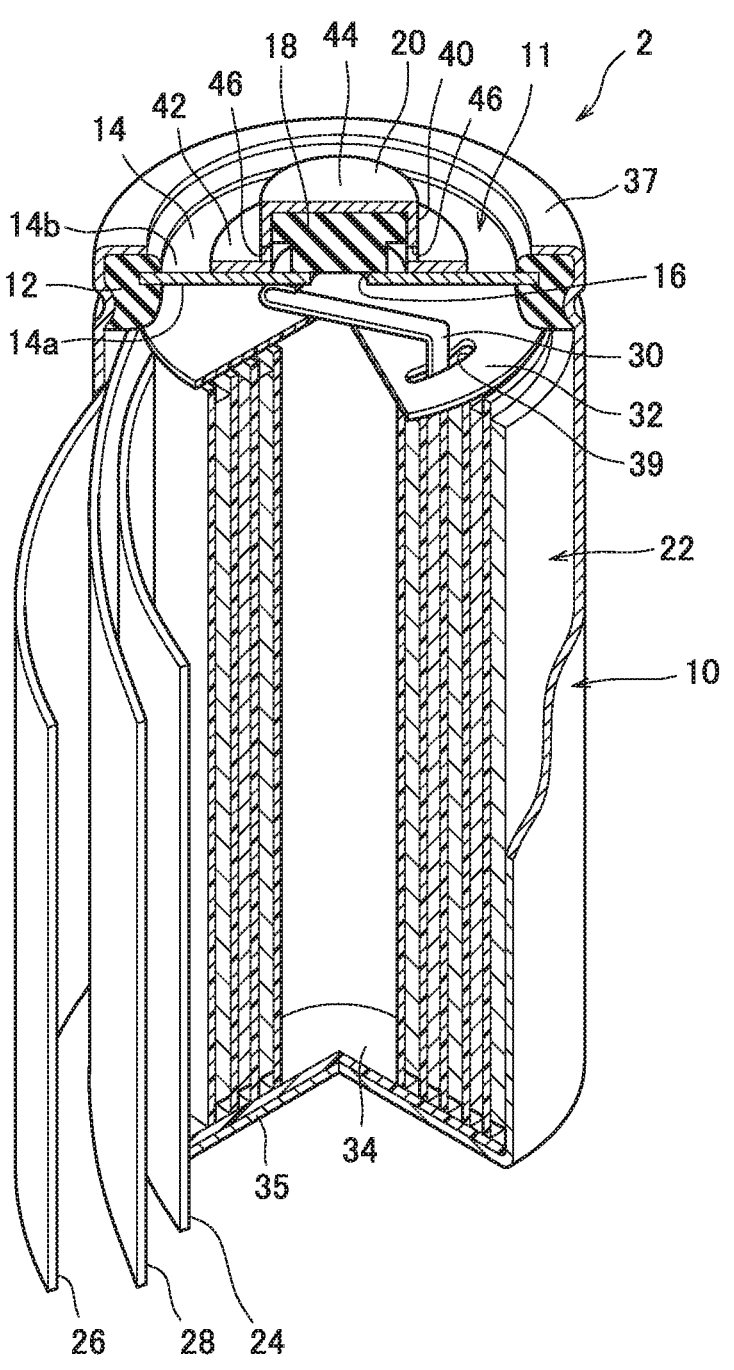
FIG. 1 is a partially broken perspective view showing a cylindrical nickel-hydrogen secondary battery according to an embodiment of the present disclosure.

As shown in FIG. 1, the battery 2 comprises an outer can 10 having a bottomed cylindrical shape including an upper end that is opened. The outer can 10 has conductivity, and includes a bottom wall 35 that functions as a negative electrode terminal. In the outer can 10, an electrode group 22 is stored.

The electrode group 22 comprises a positive electrode 24, a negative electrode 26 and a separator 28 each of which is band-shaped. Specifically, the electrode group 22 is formed by spirally winding the positive electrode 24 and the negative electrode 26 superimposed on each other via the separator 28 interposed between the electrodes. An outermost circumference of the electrode group 22 is formed by a portion (an outermost circumferential portion) of the negative electrode 26, and is in contact with an inner circumferential wall of the outer can 10. That is, the negative electrode 26 and the outer can 10 are electrically connected to each other.

Furthermore, a predetermined amount of alkaline electrolyte (not shown) is injected in the outer can 10. The alkaline electrolyte causes a charge and discharge reaction to proceed between the positive electrode 24 and the negative electrode 26. As the alkaline electrolyte, an alkaline electrolyte for use in a general nickel-hydrogen secondary battery is used. For example, it is preferable to use an aqueous sodium hydroxide solution.

As a material of the separator 28, a material for use in the general nickel-hydrogen secondary battery is used. For example, it is preferable to use non-woven fabric made of polyolefin fiber such as polyethylene or polypropylene.

The positive electrode 24 includes a conductive positive electrode substrate forming a porous structure including a large number of vacancies, and a positive electrode mixture held in the above vacancies and the surface of the positive electrode substrate.

As the positive electrode substrate, for example, foam nickel may be used.

The positive electrode mixture includes positive electrode active material particles, a conductive material, a positive electrode additive and a binder. The binder works to bind the positive electrode active material particles, the conductive material and the positive electrode additive and concurrently bind the positive electrode mixture to the positive electrode substrate. Here, as the binder, for example, carboxymethyl-cellulose or the like may be used.

The positive electrode active material particles are nickel hydroxide particles or higher-order nickel hydroxide particles.

As the conductive material, for example, one or two or more selected from the group consisting of cobalt compounds such as cobalt oxide (CoO) and cobalt hydroxide $(Co(OH)_2)$ and cobalt (Co) may be used.

As the positive electrode additive, an additive appropriately selected as required is added to improve characteristics of the positive electrode. Examples of a main positive electrode additive include yttrium oxide and zinc oxide.

The positive electrode 24 may be manufactured, for example, as follows.

First, prepared is a positive electrode mixture slurry including positive electrode active material powder that is an aggregate of the positive electrode active material particles, the conductive material, the positive electrode additive, water and the binder. For example, foam nickel is filled with the obtained positive electrode mixture slurry, and dried. After dried, foam nickel filled with nickel hydroxide particles or the like is rolled and then cut. Consequently, the positive electrode 24 holding the positive electrode mixture is manufactured.

Next, the negative electrode 26 will be described.

The negative electrode 26 includes a band-shaped conductive negative electrode core, and a negative electrode mixture is held in the negative electrode core.

The negative electrode core is a sheet metal material in which through holes are distributed. For example, a punching metal sheet may be used. The negative electrode mixture fills not only the through holes of the negative electrode core, but is also held in layers on opposite surfaces of the negative electrode core.

The negative electrode mixture includes particles of a hydrogen storage alloy, a negative electrode additive, a conductive material and a binder. Here, the hydrogen storage alloy is an alloy capable of storing and releasing hydrogen that is a negative electrode active material. There are not any special restrictions on a type of hydrogen storage alloy, but a rare earth-Mg—Ni hydrogen storage alloy including a rare earth element, Mg and Ni is preferably used. The above described binder works to bind the particles of the hydrogen storage alloy, the negative electrode additive and the conductive material to one another and concurrently bind the negative electrode mixture to the negative electrode core. Here, as the binder, hydrophilic or hydrophobic polymer may be used, and as the conductive material, carbon black, graphite, nickel power or the like may be used.

As the negative electrode additive, an additive appropriately selected as required is added to improve characteristics of the negative electrode.

The negative electrode 26 may be manufactured, for example, as follows.

First, hydrogen storage alloy powder, the conductive material, the binder and water are prepared, and these components are kneaded to prepare negative electrode mixture paste. Note that the negative electrode additive may be further added as required. The obtained negative electrode mixture paste may be applied to the negative electrode core, and dried. After dried, the negative electrode core to which the hydrogen storage alloy particles and the like adhere is rolled to increase a filling density of the hydrogen storage alloy, and then cut into a predetermined shape. Consequently, the negative electrode 26 is manufactured.

The positive electrode 24 and negative electrode 26 manufactured as described above are spirally wound in a state where the separator 28 is interposed, whereby the electrode group 22 is formed.

A sealing body 11 is fixed to an opening of the outer can 10 in which the electrode group 22 and the alkaline electrolyte are stored as described above. The sealing body 11 includes a sealing plate 14, a valve body 18 and a positive electrode cap 20.

The sealing plate 14 is a disk-shaped member having conductivity, and includes a first surface 14a located on an inner side of the battery 2, and a second surface 14b located on an outer side of the battery 2 that is opposite to the first surface 14a. Furthermore, in a center of the sealing plate 14, a central through hole 16 is made as an exhaust hole. The central through hole 16 is usually closed with the valve body 18 described later. In the opening of the outer can 10, the sealing plate 14 and a ring-shaped insulation packing 12 surrounding the sealing plate 14 are arranged, and an opening edge 37 of the outer can 10 is caulked to fix the sealing plate 14 and the insulation packing 12 to the opening edge 37 of the outer can 10.

Here, as is clear from FIG. 1, a positive electrode lead 30 is disposed between the electrode group 22 and the sealing plate 14 in the outer can 10. The positive electrode lead 30 has one end connected to the positive electrode 24, and the other end connected to the first surface 14a of the sealing plate 14. Consequently, the positive electrode 24 is electrically connected to the sealing plate 14. Note that a round upper insulation member 32 is disposed between the sealing plate 14 and the electrode group 22, and the positive electrode lead 30 extends through a slit 39 provided in the upper insulation member 32. Furthermore, a round lower insulation member 34 is also disposed between the electrode group 22 and a bottom section of the outer can 10.

On the other hand, the second surface 14b of the sealing plate 14 is electrically connected to the positive electrode cap 20 manufactured by processing a plate material made of a metal. The positive electrode cap 20 is a part that stores the valve body 18, and is a part that forms a positive electrode terminal in the battery. Therefore, the positive electrode 24 and the positive electrode terminal (the positive electrode cap 20) are electrically connected to each other via the positive electrode lead 30 and the sealing plate 14.

Figure 2:
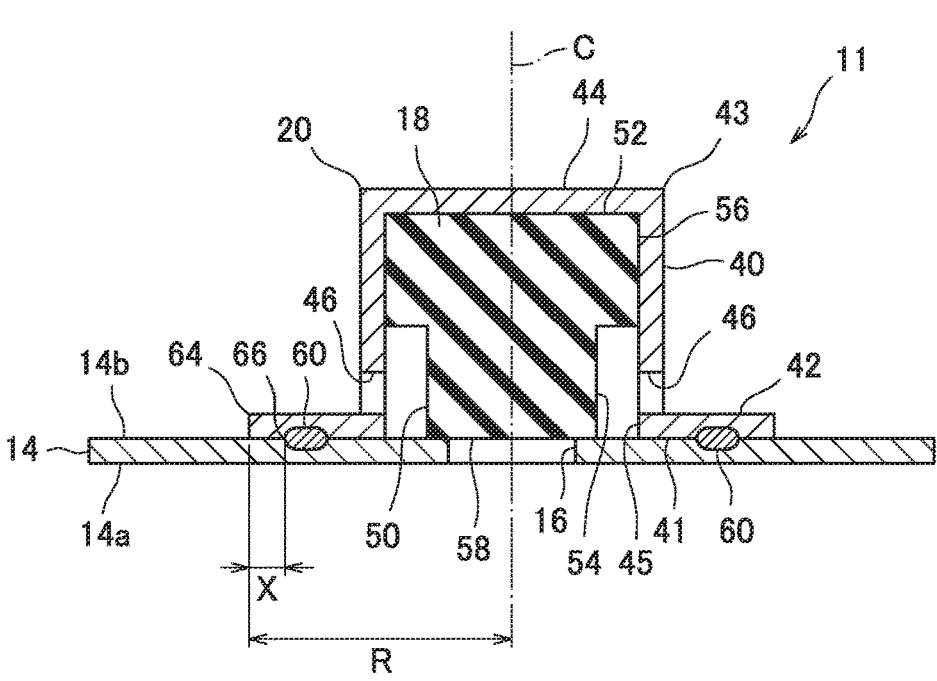
FIG. 2 is an enlarged cross-sectional view showing a sealing body according to the embodiment of the present disclosure.

As shown in FIG. 2, the positive electrode cap 20 includes a cylindrical body section 40, an annular flange 42 provided along a circumferential edge of an opening 45 of a base end 41 of the body section 40, and a top wall 44 provided to close a tip 43 opposite to the base end 41. Furthermore, as is clear from FIG. 2, a gas venthole 46 opened laterally is made in a lower section of the body section 40. The positive electrode cap 20 is disposed to cover the valve body 18, and a portion of the flange 42 is welded to the second surface 14b of the sealing plate 14. Here, an inner diameter of the body section 40 of the positive electrode cap 20 is larger than a diameter of the central through hole 16 of the sealing plate 14.

As the valve body 18, a valve body for use in the general nickel-hydrogen secondary battery is used. Preferably, for example, a columnar or stepped columnar valve body made of a rubber material is used.

The valve body 18 made of the rubber material is elastically deformable, and stored in the positive electrode cap 20 in a state of being compressed to some degree. Consequently, the valve body 18 includes a head section 52 that abuts on an inner surface of a top wall 44 of the positive electrode cap 20, and is entirely pressed toward the sealing plate 14. Furthermore, a base end face 58 of a body section 54 of the valve body 18 covers and air-tightly closes the central through hole 16. That is, the valve body 18 closes the central through hole 16 with a predetermined pressure.

The battery 2 is, for example, overcharged, and a gas is abnormally generated in the outer can 10 to raise a pressure of the gas in the battery 2. If the pressure is in excess of a predetermined pressure, the valve body 18 is compressed and deformed, to open the central through hole 16. As a result, the gas is discharged from an interior of the outer can 10 through the central through hole 16 and the gas venthole 46 of the positive electrode cap 20 to outside. When the gas is discharged to lower the pressure of the gas in the battery 2, the valve body 18 returns to its original shape to hermetically close the battery 2 again.

Figure 3:
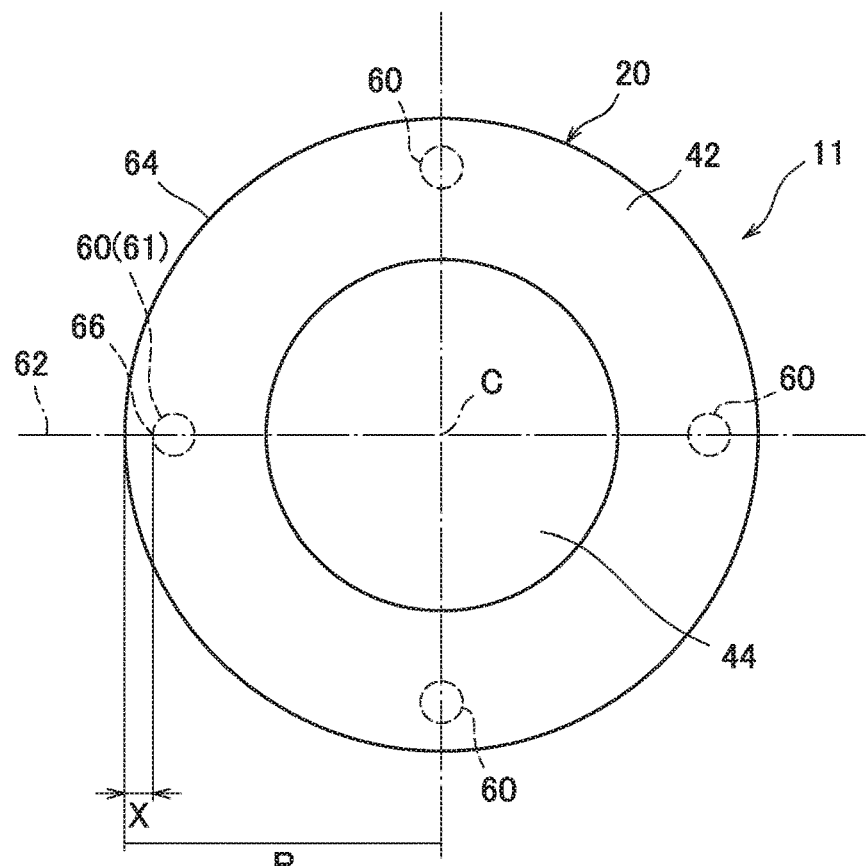
FIG. 3 is a plan view of a positive electrode cap of the sealing body according to the embodiment of the present disclosure seen from a top wall side.

Here, the flange 42 of the positive electrode cap 20 is superimposed on and welded to the sealing plate 14. Through this welding, welded parts (nuggets) 60 are formed in a region where the flange 42 and the sealing plate 14 are superimposed (see FIG. 2). In the present disclosure, positions of the welded parts 60 are specified. Specifically, as shown in FIG. 3, a straight line extending from a center C of the flange 42 toward an outer side in a radial direction of the flange 42 is assumed. For this assumed straight line, lines can be countlessly assumed on a plate surface of the flange 42, and one of the lines is defined as a first virtual line 62. Then, the welded part 60 located on the first virtual line 62 is defined as a first welded part 61. There are not any special restrictions on a shape of the first welded part 61 in planar view, but it is preferable that the shape is round.

Then, on the first virtual line 62, a length from the center C of the flange 42 to an outer circumferential edge 64 of the flange is defined as R. Note that the length R corresponds to a radius of the flange 42, i.e., a radius of the positive electrode cap 20.

Furthermore, on the first virtual line 62, a length from an edge 66 of the welded part 60 on the outer side in the radial direction of the flange 42 to the outer circumferential edge 64 of the flange 42 is defined as X.

In case of this assumption, a ratio of X to R is obtained in percentage, and a value of X is set so that the percentage is in a range of 0% or more and 2% or less.

Here, a state where the ratio of X to R is 0% indicates a state where the outer circumferential edge 64 of the flange 42 is superimposed on the edge 66 of the welded part 60 on the outer side in the radial direction of the flange 42, when the flange 42 is seen in planar view. Furthermore, a length along which the ratio of X to R is 2% indicates a length along which the length of X corresponds to 2% of the length of R (the radius of the flange 42).

The positive electrode cap 20 is welded to the sealing plate 14, and as to the obtained sealing body 11, a destructive inspection that has heretofore been performed is performed.

If the destructive inspection is performed on the sealing body 11 in which the above described ratio of X to R is in excess of 2%, the inspection is easily affected by individual differences in how to tear off the sealing body 11 or the like, and wrong determination of presence or absence of a scar is prone to occur.

If the above described ratio of X to R is 2% or less, a mother material is easily broken during the destructive inspection, and if the welded part (the nugget) 60 is formed, the mother material is surely hollowed to generate the scar. Consequently, stability of the determination of the presence or absence of the scar can increase.

In the present disclosure, there are not any special restrictions on a number of the welded parts 60, but it is preferable that a plurality of welded parts are formed via an equal space in a circumferential direction of the flange 42. In the present disclosure, as shown in FIG. 3, four welded parts 60 are formed via the equal space in the circumferential direction of the flange 42.

Figure 4:
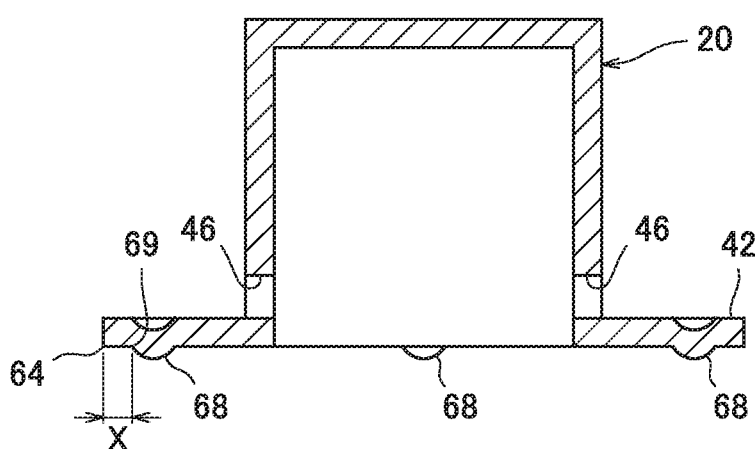
FIG. 4 is a cross-sectional view showing a vertical cross section of the positive electrode cap according to the embodiment of the present disclosure.

The above described welding between the sealing plate 14 and the flange 42 is not limited to resistance spot welding, and projection welding may be also employed. In the projection welding, for example, as shown in FIG. 4, the flange 42 of the positive electrode cap 20 is embossed to prepare the positive electrode cap 20 formed with a projection 68 that projects to a sealing plate side, and the positive electrode cap 20 and the sealing plate 14 are pressurized and brought into contact with each other. In this state, a current of electricity is supplied. Consequently, the current of electricity concentrates on a portion of the projection 68, and resistance heat is generated. Then, the portion of the projection 68 of the flange 42 and a portion of the sealing plate 14 that comes in contact with the projection 68 are molten and then coagulate, and the welded part 60 is formed. In case of this projection welding, a shape of the projection 68 in planar view and a shape of the welded part 60 in planar view that is formed after energized are about the same shape. That is, in case where the shape of the projection 68 in planar view is round, the shape of the welded part 60 in planar view that is formed after energized is also round, and diameters of the projection 68 and welded part 60 almost match each other. Consequently, in case of performing the projection welding, as to the projection 68 provided in the flange 42, it is preferable that a length from an edge 69 of the projection on the outer side in the radial direction of the flange 42 to the outer circumferential edge 64 of the flange 42 is equal to the above described length X.

As described above, according to the present disclosure, the position of the welded part 60 in the sealing body 11 is specified, so that accuracy in determination of pass or failure of welding in the destructive inspection can increase. A number of times to perform an unnecessary adjustment operation of welding conditions can be decreased, and the high-quality sealing body 11 and eventually the high-quality battery 2 can be efficiently and stably supplied.

EXAMPLES

1. Manufacturing of Nickel-Hydrogen Secondary Battery

Example 1

(1) Manufacturing of Sealing Body

First, prepared was a valve body 18 generally for use in a nickel-hydrogen secondary battery and made of ethylene propylene diene rubber. For example, as shown in FIG. 2, the valve body forms a stepped columnar shape including a columnar head section 52, and a columnar body section 54 having a diameter that is reduced to be smaller than that of the head section 52 and located coaxially with the head section 52.

Next, a nickel plated steel plate having a thickness of 0.2 mm was punched and pressed, to manufacture an intermediate product of a positive electrode cap having a flanged cylindrical shape. A flange portion of the obtained intermediate product was embossed, to form four projections 68 at four equally divided positions of a flange in a circumferential direction, and such a positive electrode cap 20 as shown in FIG. 4 was manufactured. Here, a radius R of the positive electrode cap (a flange 42) 20 was 4.9 mm, a radius of the projection 68 was 0.6 mm, and a length from an outer circumferential edge 64 of the flange to an edge (an edge on an outer side in a radial direction of the flange) 69 of the projection 68 was 0.1 mm. At this time, a ratio of the length from the outer circumferential edge of the flange to the edge of the projection to R is 2.0%.

Furthermore, the nickel plated steel plate having the thickness of 0.2 mm was punched, to manufacture a disk-shaped sealing plate 14 having a center provided with a central through hole 16.

Next, the valve body 18 was stored in the positive electrode cap 20, and the positive electrode cap 20 was superimposed on a second surface 14b of the sealing plate 14. A predetermined pressure was applied to perform projection welding. At this time, the valve body 18 was disposed at a position that closes the central through hole 16 of the sealing plate 14. Thus, a sealing body 11 was manufactured.

The above procedure was repeated to manufacture a plurality of sealing bodies 11.

Here, a cross section of the completely welded sealing body 11 was observed, and a radius of a welded part 60, and a length X from the outer circumferential edge 64 of the flange 42 to an edge 66 of the welded part 60 on an outer side in a radial direction of the flange were measured. As a result, the radius of the welded part 60 was 0.6 mm. Furthermore, the length X was 0.1 mm, and hence a ratio of X to R in percentage was 2.0%. Consequently, a position of the projection 68 is the same as a position of the welded part 60.

(2) Destructive Inspection of Sealing Body

As to the sealing bodies 11 manufactured as described above, a predetermined number of sealing bodies 11 were taken from a predetermined lot as samples. For each of the obtained samples, the positive electrode cap 20 and the sealing plate 14 were torn off using a predetermined tool to perform a destructive inspection. Joined surfaces of the flange 42 of the positive electrode cap 20 and the sealing plate 14 that were torn off were observed. Then, counted were a number of samples in which hollowed scars could be confirmed in all of four portions corresponding to the welded parts 60. Then, a ratio of the number of the samples in which the hollowed scars could be confirmed in all of the four portions to a total number of samples in percentage was obtained. Table 1 shows the obtained result as a 4-nuggets ratio.

(3) Cross-Section Observation

As to the sample in which the scar could not be confirmed in any of the four portions corresponding to the welded parts 60 in the destructive inspection and which was determined to be defective, a metallographic structure of a cross section of the welded part was observed, to observe whether or not the welded part (the nugget) was actually formed. Then, among the samples that were determined to be defective, a number of wrongly determined samples that were actually formed with the welded parts (the nuggets) were counted. Afterward, a ratio of the number of the wrongly determined samples to a total number of the samples that were determined to be defective in percentage was obtained. Table 1 shows the obtained result as a wrong determination ratio.

(4) Assembly of Cylindrical Nickel-Hydrogen Secondary Battery

Next, a positive electrode 24 and a negative electrode 26 for use in a general nickel-hydrogen secondary battery were spirally wound in a state where a separator 28 comprising non-woven fabric made of polypropylene fiber was interposed between the electrodes, to manufacture an electrode group 22.

The obtained electrode group 22 was stored together with aqueous sodium hydroxide solution as an alkaline electrolyte in a bottomed cylindrical outer can 10.

Next, as to the lot including the sample in which the scar could not be confirmed in one of the four portions corresponding to the welded parts 60 in the above described destructive inspection, welding conditions were adjusted and welding was performed again. Then, the sealing bodies of the lot in which the adjustment of the welding conditions was completed were prepared together with sealing bodies of a lot determined to be excellent (the lot including the sample in which the hollowed scars could be confirmed in all of the four portions corresponding to the welded parts 60), to prepare a predetermined number of sealing bodies. The sealing body 11 prepared in this way was electrically connected to the positive electrode 24 via a positive electrode lead 30, and then the sealing body 11 was caulked and fixed to an opening of an upper end of the outer can 10 via an insulation packing 12. Thus, a battery 2 was assembled.

Example 2

The procedure of Example 1 was repeated to manufacture a sealing body 11 and a battery 2, except that a radius R of a positive electrode cap 20 (a flange 42) was 4.65 mm and a length from an outer circumferential edge 64 of the flange to an edge (an edge on an outer side in a radial direction of the flange) 69 of a projection 68 was 0 mm. When a length X from the outer circumferential edge 64 of the flange to an edge 66 of a welded part 60 on an outer side in a radial direction in the flange was measured, the length was 0 mm. That is, a ratio of X to R in percentage is 0%. Note that in a sealing body of Example 2, there were not any samples in which a scar could not be confirmed in one of four portions corresponding to the welded parts 60, and a 4-nuggets ratio was 100%. Consequently, it was not necessary to adjust welding conditions.

Comparative Example 1

The procedure of Example 1 was repeated to manufacture a sealing body 11 and a battery 2, except that a radius R of a positive electrode cap 20 (a flange 42) was 7.3 mm, a radius of a projection 68 was 0.75 mm and a length from an outer circumferential edge 64 of the flange to an edge (an edge on an outer side in a radial direction of the flange) 69 of the projection 68 was 0.3 mm. Note that when a length X from the outer circumferential edge 64 of the flange to an edge 66 of a welded part 60 on an outer side in a radial direction in the flange was measured, the length was 0.3 mm. That is, a ratio of X to R in percentage is 4.1%.

Comparative Example 2

The procedure of Example 1 was repeated to manufacture a sealing body 11 and a battery 2, except that a radius R of a positive electrode cap 20 (a flange 42) was 6.0 mm and a length from an outer circumferential edge 64 of the flange to an edge (an edge on an outer side in a radial direction of the flange) 69 of a projection 68 was 0.3 mm. Note that when a length X from the outer circumferential edge 64 of the flange to an edge 66 of a welded part 60 on an outer side in a radial direction in the flange was measured, the length was 0.3 mm. That is, a ratio of X to R in percentage is 5.0%.

Comparative Example 3

The procedure of Example 1 was repeated to manufacture a sealing body 11 and a battery 2, except that a radius R of a positive electrode cap 20 (a flange 42) was 5.65 mm, a radius of a projection was 0.6 mm, and a length from an outer circumferential edge 64 of the flange to an edge (an edge on an outer side in a radial direction of the flange) 69 of a projection 68 was 0.2 mm. Note that when a length X from the outer circumferential edge 64 of the flange to an edge 66 of a welded part 60 on an outer side in a radial direction in the flange was measured, the length was 0.2 mm. That is, a ratio of X to R in percentage is 3.5%.

Comparative Example 4

The procedure of Example 1 was repeated to manufacture a sealing body 11 and a battery 2, except that a radius R of a positive electrode cap 20 (a flange 42) was 4.85 mm and a length from an outer circumferential edge 64 of the flange to an edge (an edge on an outer side in a radial direction of the flange) 69 of a projection 68 was 0.2 mm. Note that when a length X from the outer circumferential edge 64 of the flange to an edge 66 of a welded part 60 on an outer side in a radial direction in the flange was measured, the length was 0.2 mm. That is, a ratio of X to R in percentage is 4.1%.

Comparative Example 5

The procedure of Example 1 was repeated to manufacture a sealing body 11 and a battery 2, except that a radius R of a positive electrode cap 20 (a flange 42) was 3.1 mm, a radius of a projection was 0.4 mm, and a length from an outer circumferential edge 64 of the flange to an edge (an edge on an outer side in a radial direction of the flange) 69 of a projection 68 was 0.19 mm. Note that when a length X from the outer circumferential edge 64 of the flange to an edge 66 of a welded part 60 on an outer side in a radial direction in the flange was measured, the length was 0.19 mm. That is, a ratio of X to R in percentage is 6.1%.

2. Cap-Off Occurrence Ratio of Obtained Battery

In an assembling process of the battery 2 of each of Example 1, Comparative Example 1, Comparative Example 2, Comparative Example 4 and Comparative Example 5, a number of batteries 2 in which removal of the positive electrode cap actually occurred was counted. Then, a ratio of the number of the batteries in which positive electrode cap-off occurred to a total number of the batteries was obtained for each of Example 1, Comparative Example 1, Comparative Example 2, Comparative Example 4 and Comparative Example 5. Table 1 also shows the result as a cap-off occurrence ratio.

3. Considerations

From Table 1, in Comparative Examples 1 to 5 in which a ratio of X to R is 4.1% or more, a 4-nuggets ratio is from 50 to 70%. In this case, the samples in each of which a scar could not be confirmed in one of four portions corresponding to the welded parts 60 and which was therefore determined to be defective were present as much as from 30 to 50%. However, when a cross section of each sample determined to be defective was observed and a wrong determination ratio was obtained, it was found that wrongly determined samples were present at a ratio of 30 to 50%. Specifically, some of sealing bodies formed with suitable welded parts were determined to be defective. Consequently, it can be considered that there is a situation where an unnecessary welding adjustment operation is performed.

The unnecessary welding adjustment operation may be a cause for generation of defective products. For example, although the welding conditions are appropriate, it is wrongly determined that the welding adjustment is required, and increase of a value of a welding current of electricity or another adjustment is performed. Then, explosion or the like occurs and a welding defect of the positive electrode cap may occur. In this case, it is considered that in the obtained battery, occurrence of the positive electrode cap-off due to the welding defect in a manufacturing process leads to increase in cap-off occurrence ratio. In Comparative Examples 1, 2, 4 and 5, the cap-off occurrence ratio was from 0.02 to 0.10 ppm, and the positive electrode cap-off occurred.

On the other hand, in Examples 1 and 2 in which the ratio of X to R is 2.0% or less, the 4-nuggets ratio is from 90 to 100%. That is, if a suitable welded part is formed in each of the sealing bodies of Examples 1 and 2, a hollowed scratch is formed more surely than in the sealing body of each comparative example, during the destructive inspection. Consequently, it may be considered that accuracy in determination of a scar increases.

In each of Examples 1 and 2, a wrong determination ratio is from 0% to 10%, and it can be considered that a ratio of wrong determination of a state where the suitable welded part is formed is extremely low and that a good product or a defective product can be easily confirmed. Consequently, it can be considered that if the 4-nuggets ratio increases, the wrong determination ratio decreases.

As described above, if the 4-nuggets ratio increases, wrong determinations decrease, and a frequency of the unnecessary welding adjustment operation decreases. As a

TABLE 1

| | Radius R of positive electrode cap [mm] | Length X [mm] | Ratio of X to R [%] | 4-nuggets ratio [%] | Wrong determination ratio [%] | Cap-off occurrence ratio [ppm] |
|---|---|---|---|---|---|---|
| Example 1 | 4.9 | 0.1 | 2.0 | 90 | 10 | 0 |
| Example 2 | 4.65 | 0 | 0 | 100 | 0 | — |
| Comparative Example 1 | 7.3 | 0.3 | 4.1 | 50 | 50 | 0.10 |
| Comparative Example 2 | 6.0 | 0.3 | 5.0 | 50 | 50 | 0.06 |
| Comparative Example 3 | 5.65 | 0.2 | 3.5 | 70 | 30 | — |
| Comparative Example 4 | 4.85 | 0.2 | 4.1 | 60 | 40 | 0.02 |
| Comparative Example 5 | 3.1 | 0.19 | 6.1 | 60 | 40 | 0.02 | result, the welding defect due to the unnecessary welding adjustment operation can be inhibited from being latent. It is considered that decrease in ratio at which the welding defect is latent leads to decrease in cap-off occurrence ratio at which the positive electrode cap-off occurs in the manufacturing process, in the obtained battery. In Example 1, the cap-off occurrence ratio is 0 ppm, and a suitable result indicating that the positive electrode cap-off does not occur is obtained.

From the above, according to the present disclosure, an inspection to determine whether the welded part of the sealing body is excellent or non-excellent can be reliably performed with less wrong determinations, and a number of times to perform the unnecessary welding adjustment operation can be decreased. As a result, a high-quality sealing body and eventually a high-quality battery can be stably supplied, and increase in manufacturing efficiency of the battery can be achieved.

Note that the present disclosure is not limited to the above described embodiment and examples, and can be variously modified. For example, a type of battery is not limited to the nickel-hydrogen secondary battery, and may be a nickel-cadmium secondary battery, a lithium ion secondary battery or the like.

<Aspects of Present Disclosure>

A first aspect of the present disclosure is directed to a sealing body comprising a sealing plate, and a positive electrode cap welded to the sealing plate, wherein the positive electrode cap includes a cylindrical body section, an annular flange provided along a circumferential edge of an opening located at a base end of the body section, and a top wall provided to close a tip opposite to the base end, and a welded part between the sealing plate and the positive electrode cap is present in a region where the sealing plate and the flange are superimposed, and is located at a position where a ratio of X to R in percentage is 0% or more and 2% or less, in which R is a length from a center of the flange to an outer circumferential edge of the flange, and X is a length from an edge of the welded part on an outer side in a radial direction of the flange to the outer circumferential edge of the flange.

A second aspect of the present disclosure is directed to the above first aspect of the present disclosure, wherein a plurality of welded parts are formed via an equal space in a circumferential direction of the flange.

A third aspect of the present disclosure is directed to a battery comprising an outer can having an opening at an upper end, an electrode group stored together with an electrolyte in the outer can, and a sealing body that seals the opening of the outer can, wherein the sealing body is the above described sealing body according to the first aspect or the second aspect of the present disclosure.

EXPLANATION OF REFERENCE SIGNS 2 nickel-hydrogen secondary battery
10 outer can
12 insulation packing
11 sealing body
14 sealing plate
18 valve body
20 positive electrode cap (a positive electrode terminal)
24 positive electrode
26 negative electrode
28 separator
42 flange
60 welded part (a nugget)

64 outer circumferential edge
66 edge

The invention claimed is:

1. A sealing body comprising a sealing plate having a first surface, and a positive electrode cap welded to the first surface of the sealing plate, wherein:

the positive electrode cap includes a cylindrical body section, an annular flange provided along a circumferential edge of an opening located at a base end of the body section, and a top wall provided to close a tip opposite to the base end, wherein the annular flange has a second surface extending across a full radial extent of the annular flange, the entirety of the second surface being disposed parallel to an entirety of the sealing plate and directly abutting the first surface of the sealing plate;

a welded part provided between the first surface of the sealing plate and the second surface of the annular flange of the positive electrode cap, wherein the welded part is a spot weld located at a position between the first and second surfaces where a ratio of X to R in percentage is 2% or less, in which R is a length from a center of the flange to an outer circumferential edge of the flange, and X is a length from a radially outermost edge of the welded part to the outer circumferential edge of the flange, and the radially outermost edge of the welded part is disposed radially inward of the outer circumferential edge of the flange; and a valve body abutting both the annular flange and the sealing plate is contained within the cylindrical body section of the positive electrode cap.

2. The sealing body according to claim 1, wherein a plurality of the welded parts are formed via an equal space in a circumferential direction of the flange.

3. A battery comprising an outer can having an opening at an upper end, an electrode group stored together with an electrolyte in the outer can, and a sealing body that seals the opening of the outer can, wherein the sealing body is the sealing body according to claim 1.

4. A battery comprising an outer can having an opening at an upper end, an electrode group stored together with an electrolyte in the outer can, and a sealing body that seals the opening of the outer can, wherein the sealing body is the sealing body according to claim 2.

5. A sealing body comprising a sealing plate having a first surface, and a positive electrode cap welded to the first surface of the sealing plate, wherein:

the positive electrode cap includes a cylindrical body section, an annular flange provided along a circumferential edge of an opening located at a base end of the body section, and a top wall provided to close a tip opposite to the base end, wherein the annular flange has a second surface extending across a full radial extent of the annular flange, the entirety of the second surface being disposed parallel to an entirety of the sealing plate and directly abutting the first surface of the sealing plate;

a welded part provided between the first surface of the sealing plate and the second surface of the annular flange of the positive electrode cap, wherein the welded part is a spot weld located at a position between the first and second surfaces where a ratio of X to R in percentage is 2% or less, in which R is a length from a center of the flange to an outer circumferential edge of the flange, and X is a length from a radially outermost edge of the welded part to the outer circumferential edge of the flange, and the radially outermost edge of the welded part is disposed radially inward of the outer circumferential edge of the flange; and a valve body abutting both the annular flange and the sealing plate is contained within the cylindrical body section of the positive electrode cap.

6. The sealing body according to claim 5, wherein a plurality of the welded parts are formed via an equal space in a circumferential direction of the flange.

7. A battery comprising an outer can having an opening at an upper end, an electrode group stored together with an electrolyte in the outer can, and a sealing body that seals the opening of the outer can, wherein the sealing body is the sealing body according to claim 5.

8. A battery comprising an outer can having an opening at an upper end, an electrode group stored together with an electrolyte in the outer can, and a sealing body that seals the opening of the outer can, wherein the sealing body is the sealing body according to claim 6.

9. The sealing body of claim 5 wherein the valve body is columnar in shape.

10. The sealing body of claim 5 wherein the valve body has a stepped columnar shape.

11. A sealing body comprising a sealing plate having a first surface, and a positive electrode cap welded to the first surface of the sealing plate, wherein:

the positive electrode cap includes a cylindrical body section, an annular flange provided along a circumferential edge of an opening located at a base end of the body section, a top wall provided to close a tip opposite to the base end, and a midpoint located halfway between the base end and the tip, wherein the annular flange has a second surface extending across a full radial extent of the annular flange, the entirety of the second surface being disposed parallel to an entirety of the sealing plate and directly abutting the first surface of the sealing plate;

a welded part provided between the first surface of the sealing plate and the second surface of the annular flange of the positive electrode cap, wherein the welded part is a spot weld located between the first and second surfaces at a position where a ratio of X to R in percentage is 2% or less, in which R is a length from a center of the flange to an outer circumferential edge of the flange, and X is a length from a radially outermost edge of the welded part to the outer circumferential edge of the flange, and the radially outermost edge of the welded part is disposed radially inward of the outer circumferential edge of the flange; and a gas venthole is in the cylindrical body section of the positive electrode cap located between the midpoint of the positive electrode cap and the base end.

12. The sealing body according to claim 11, wherein a plurality of the welded parts are formed via an equal space in a circumferential direction of the flange.

13. A battery comprising an outer can having an opening at an upper end, an electrode group stored together with an electrolyte in the outer can, and a sealing body that seals the opening of the outer can, wherein the sealing body is the sealing body according to claim 11.

14. A battery comprising an outer can having an opening at an upper end, an electrode group stored together with an electrolyte in the outer can, and a sealing body that seals the opening of the outer can, wherein the sealing body is the sealing body according to claim 12.

15. The battery of claim 13 wherein the gas venthole is configured to vent gas from inside the outer can to an atmosphere outside the battery.

16. The sealing body according to claim 1, wherein the welded part is solely located between the first and second surfaces and at a position where the ratio of X to R in percentage is 0% or more and 2% or less.

17. The sealing body according to claim 5, wherein the welded part is solely located between the first and second surfaces and at a position where the ratio of X to R in percentage is 0% or more and 2% or less.

18. The sealing body according to claim 11, wherein the welded part is solely located between the first and second surfaces and at a position where the ratio of X to R in percentage is 0% or more and 2% or less.

19. The sealing body of claim 5, wherein the valve body forms a gas seal to an aperture through the sealing plate.

* * * * *